US008080075B2

(12) United States Patent
Doering et al.

(10) Patent No.: US 8,080,075 B2
(45) Date of Patent: Dec. 20, 2011

(54) INTAKE SYSTEM FOR SUCKING IN COMBUSTION AIR AND MANUALLY GUIDED PIECE OF EQUIPMENT

(75) Inventors: Manfred Doering, Hamburg (DE); Carsten Ziegs, Hamburg (DE); Torsten Luethje, Hamburg (DE); Jan Janzen, Hamburg (DE); Florian Soldat, Hamburg (DE)

(73) Assignee: DOLMAR GmbH, Hamburg (DE)

( * ) Notice: Subject to any disclaimer, the term of this patent is extended or adjusted under 35 U.S.C. 154(b) by 0 days.

(21) Appl. No.: 12/591,050

(22) Filed: Nov. 5, 2009

(65) Prior Publication Data

US 2010/0132656 A1 Jun. 3, 2010

(30) Foreign Application Priority Data

Dec. 3, 2008 (DE) ..................... 20 2008 015 957 U

(51) Int. Cl.
*B01D 50/00* (2006.01)

(52) U.S. Cl. ................ 55/337; 55/325; 55/326; 55/322; 55/385.3; 55/467; 55/447; 55/345; 55/346; 55/348; 55/456; 55/457; 55/406; 55/400; 55/401; 123/198 E

(58) Field of Classification Search .................... 55/325, 55/326, 322, 337, 385.3, 467, 447, 345–346, 55/348, 456, 457, 406, 400–401; 123/198 E
See application file for complete search history.

(56) References Cited

U.S. PATENT DOCUMENTS 2,424,572 A * 7/1947 Lincoln ........................... 55/348
3,877,454 A * 4/1975 Axmann et al. .......... 123/198 E
4,459,141 A * 7/1984 Burrington et al. ............. 55/391
4,537,608 A * 8/1985 Koslow ........................... 55/337
4,746,340 A * 5/1988 Durre et al. ...................... 55/347
5,480,464 A 1/1996 De Villiers et al.
5,632,243 A * 5/1997 Buchholz .................. 123/198 E (Continued)

FOREIGN PATENT DOCUMENTS

DE 25 50 165 C3 5/1976

(Continued)

OTHER PUBLICATIONS

Translation of JP 2007321727, 20 pages.*

(Continued)

*Primary Examiner* — Jason M Greene
*Assistant Examiner* — Dung H Bui
(74) *Attorney, Agent, or Firm* — Oliff & Berridge, PLC

(57) ABSTRACT

In order to provide an intake system for sucking in combustion air of an internal combustion engine of a piece of equipment, in particular a portable, manually guided piece of equipment, having more than one centrifugal separator comprising a centrifugal separator housing, and having an air filter device comprising an air filter housing, which bounds an air filter receiving space for an air filter, in which the combustion air can be separated by means of the centrifugal separator into a core volume stream and an outer volume stream, wherein the core volume stream is fed to the internal combustion engine through the air filter receiving space, which intake system is as compact as possible and correspondingly designed to be not very component-intensive, it is proposed for the centrifugal separator housing to be arranged on the air filter housing such that it ends directly at the air filter receiving space or projects directly into the air filter receiving space.

15 Claims, 4 Drawing Sheets

U.S. PATENT DOCUMENTS

Figure 1:
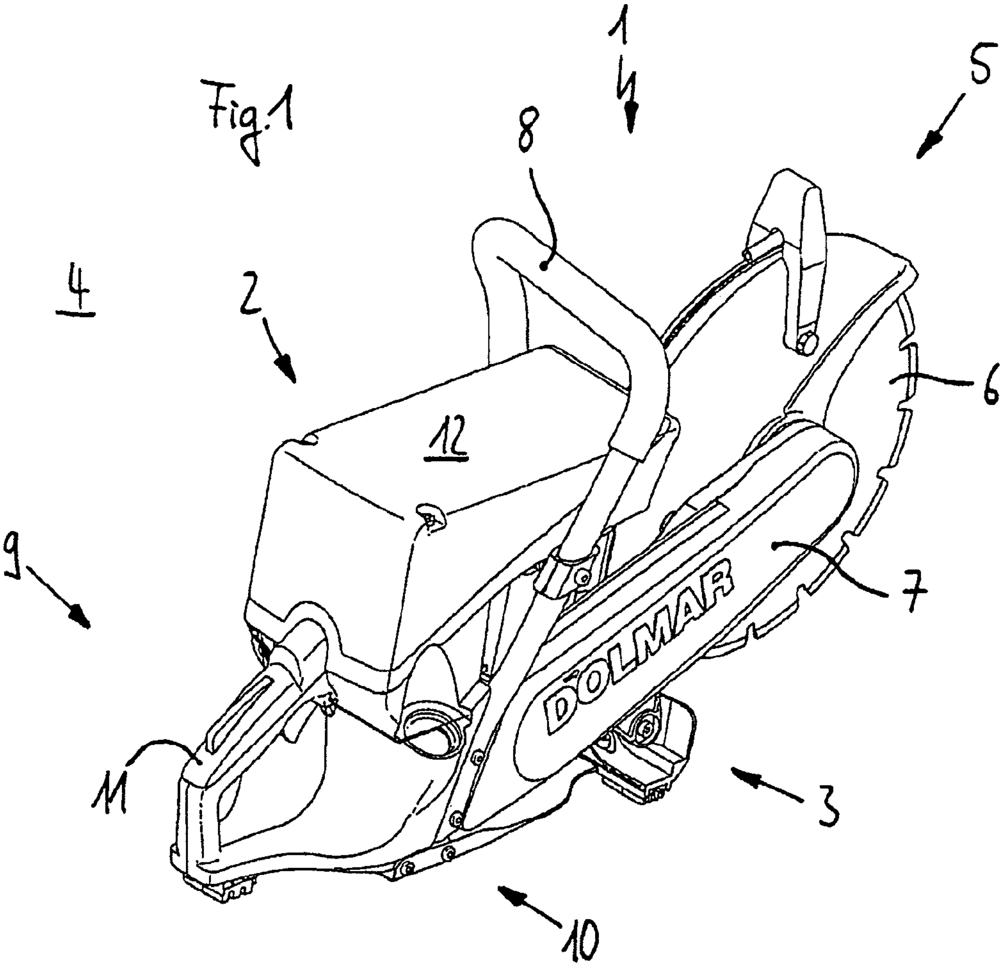

| | | | | |
|---|---|---|---|---|
| 6,681,726 | B2 * | 1/2004 | Linsbauer et al. | 123/41.65 |
| 6,758,186 | B2 * | 7/2004 | Janoske | 123/198 E |
| 6,884,273 | B2 * | 4/2005 | Kopec et al. | 55/346 |
| 6,966,940 | B2 * | 11/2005 | Krisko et al. | 55/497 |
| 6,991,664 | B2 * | 1/2006 | Riehmann et al. | 55/321 |
| 7,008,467 | B2 * | 3/2006 | Krisko et al. | 95/268 |
| 7,244,282 | B2 * | 7/2007 | Greif et al. | 55/347 |
| 7,323,023 | B2 * | 1/2008 | Michele et al. | 55/337 |
| 7,412,961 | B2 * | 8/2008 | Doring | 123/198 E |
| 7,491,254 | B2 * | 2/2009 | Krisko et al. | 55/337 |
| 7,497,886 | B2 * | 3/2009 | Walker | 55/385.1 |
| 7,691,164 | B2 * | 4/2010 | Kellermann | 55/467 |
| 7,695,539 | B2 * | 4/2010 | Waibel | 55/502 |
| 2002/0189573 | A1 * | 12/2002 | Janoske | 123/198 E |
| 2004/0094114 | A1 * | 5/2004 | Riehmann et al. | 123/198 E |
| 2004/0231633 | A1 * | 11/2004 | Uhl et al. | 123/198 E |
| 2005/0150199 | A1 * | 7/2005 | Michele et al. | 55/385.1 |
| 2005/0172587 | A1 * | 8/2005 | Moredock et al. | 55/396 |
| 2006/0107634 | A1 * | 5/2006 | Ohlendorf | 55/385.1 |
| 2007/0000134 | A1 * | 1/2007 | Uhl et al. | 30/130 |
| 2007/0131195 | A1 * | 6/2007 | Doring | 123/198 E |
| 2007/0137153 | A1 * | 6/2007 | Oh et al. | 55/385.1 |

FOREIGN PATENT DOCUMENTS

| | | |
|---|---|---|
| DE | 102 35 761 A1 | 2/2004 |
| DE | 10 2005 031 058 A1 | 1/2007 |
| JP | A-2007-321727 | 12/2007 |

OTHER PUBLICATIONS

German Search Report issued in Application No. 20 2008 015 957.1 on Oct. 27, 2009 with English translation.

* cited by examiner

INTAKE SYSTEM FOR SUCKING IN COMBUSTION AIR AND MANUALLY GUIDED PIECE OF EQUIPMENT

The invention relates firstly to an intake system for sucking in combustion air of an internal combustion engine of a piece of equipment, in particular a portable, manually guided piece of equipment, having more than one centrifugal separator comprising a centrifugal separator housing, and having an air filter device comprising an air filter housing which bounds an air filter receiving space for an air filter, in which the combustion air can be separated by means of the centrifugal separator into a core volume stream and an outer volume stream, wherein the core volume stream is fed to the internal combustion engine through the air filter receiving space. The invention also relates to a manually guided piece of equipment, in particular an angle grinder, with an internal combustion engine for driving a tool.

Generic intake systems for sucking in combustion air of an internal combustion engine, in particular of a manually guided piece of equipment, are well known in many forms from the prior art.

For example, DE 25 50 165 C3 describes a combustion air intake system for feeding an internal combustion engine which drives a hover mower. The combustion air intake system has a single tangential centrifugal separator which is arranged upstream of an air filter in such a manner that only a core air stream can reach the air filter and an outer air stream is conducted past the air filter. To this end, the single tangential centrifugal separator has a cylindrical housing with tangential air inlets, with an opening which is open towards the air filter being arranged in the centre of the cylindrical housing. Although well precleaned combustion air is fed to the internal combustion engine by means of the single tangential centrifugal separator, the combustion air intake system is of relatively large construction owing to the single tangential centrifugal separator with its tangential air inlets which are arranged radially further outwards, so that this is disadvantageous in particular in smaller manually guided pieces of equipment. In addition, the housing of the single tangential centrifugal separator and a housing of the air filter are divided in two so that the combustion air intake system is configured to have a relatively large number of components.

DE 102 35 761 A1 describes an intake device of no less component-intensive construction for combustion air of an internal combustion engine of a manually guided and also portable piece of equipment, in which however a basic body of a cyclone of a centrifugal separator device forms a common component with an air filter housing. The centrifugal separator device and all the cyclones thereof are however arranged adjacent to the air filter housing in such a manner that at least necessarily a deflection device must be arranged between each of the cyclones and the air filter so that the prefiltered combustion air can get from the respective cyclone to the air filter. This alone means that the intake device has a relatively large construction and likewise a large number of components, which is disadvantageous in particular in portable, manually guided pieces of equipment.

It is thus the object of the present invention to provide a generic intake system which is designed to be as compact as possible, with a correspondingly small number of components.

This object is achieved by an intake system with the features of the present application.

If the centrifugal separator housing ends directly at the air filter receiving space or if the centrifugal separator housing projects directly into the air filter receiving space, it is not necessary to deflect the core volume stream in a complex manner from the centrifugal separator towards the air filter by means of further components or assemblies. In particular, a deflection of the core volume stream as provided in the intake device of DE 102 35 761 A1 is no longer necessary. This means not only that fewer components are used for the intake system, but also that space is advantageously saved in the piece of equipment.

This is advantageous in particular in a centrifugal separator device with a plurality of centrifugal separators and in manually guided pieces of equipment which must be carried by a user during operation, as is the case in the present invention.

The term “centrifugal separator” in this case describes essentially an axial centrifugal separator of a centrifugal separator device, with it however being possible in the present case for tangential centrifugal separators also to be used. The term cyclone is often used instead of the term centrifugal separator, in which case it is always a matter of separating a main volume stream into a core volume stream and an outer volume stream. As such centrifugal separators or cyclones are sufficiently known from the prior art, a detailed functional description is omitted here. The term “core volume stream” describes essentially an air volume stream which has fewer dirt particles than the outer volume stream, which is moved and conducted radially further outwards than the core volume stream by means of suitable conducting apparatuses of the centrifugal separator.

The core volume stream can be guided in a particularly advantageous manner from the respective centrifugal separator of the centrifugal separator device to the air filter device if the respective centrifugal separator housing comprises a dip tube with a main flow direction of the core volume stream of the centrifugal separator, with the main flow direction of the dip tube being essentially aligned with an axial main extent of the air filter receiving space.

It is furthermore advantageous if a core volume stream outlet of the centrifugal separator housing is arranged essentially axially upstream of a core volume stream inlet of the air filter receiving space, as viewed in the flow direction of the core volume. This also means that no further components or assemblies are necessary to conduct the core volume stream from one of the centrifugal separators of the centrifugal separator device to the air filter device. To this extent the intake system can be given an even simpler construction.

A further advantageous variant provides for the intake system to have an axial conducting device for the core volume stream, by means of which the core volume stream can be conducted axially from the centrifugal separator to the air filter receiving space without being deflected. Owing to the axial conducting device, which conducts the core volume stream axially to the air filter receiving space without deflecting it, substantially lower flow energy losses can be produced in the intake system, in particular with regard to the core volume stream.

The axial conducting device is preferably provided directly by the centrifugal separator housing and/or by the air filter housing, as a result of which the intake system can have a particularly simple design. The piece of equipment can have a further simplified construction overall if the centrifugal separator housing and the air filter housing are designed in one piece so as to form a single-piece covering hood of the piece of equipment together, in particular injection-moulded or cast in one piece. The single-piece covering hood preferably consists in this case of a plastic so that it can have a very light construction.

In particular, assembly and disassembly effort, in particular with respect to maintenance work, can be substantially reduced with the single-piece covering hood.

Furthermore, the single-piece covering hood can be easily cleaned apart from the piece of equipment, with it also being possible for the centrifugal separator of the centrifugal separator device and the air filter of the air filter device to be cleaned quickly and with little effort.

If the centrifugal separator housing and the air filter housing are combined to form the single-piece covering hood, the risk of incorrect assembly or operation can also be reduced, as a result of which the general operational safety of the piece of equipment can be improved.

The intake system can have an even more compact construction if a core volume stream conducting device is arranged downstream of the air filter receiving space between two centrifugal separator housings. The centrifugal separators of the centrifugal separator device can have a simpler construction if the centrifugal separator housing is configured in one piece comprising at least one combustion air input device, a core volume stream output device and an outer volume stream output device. For example, the combustion air input device on the centrifugal separator housing is formed merely by a combustion air input opening, through which ambient air can be sucked in from the environment of the piece of equipment. A core volume stream output device can correspondingly be provided in a structurally particularly simple manner by a core volume stream output opening which is arranged directly at the air filter receiving space or projects into the air filter receiving space.

If a combustion air input device of the centrifugal separator housing and a core volume stream output device of the centrifugal separator housing are arranged axially one behind the other, on the centrifugal separator housing, the respective centrifugal separator can be designed in a particularly compact manner as an axial centrifugal separator of the present centrifugal separator device.

Furthermore, a preferred variant is characterised in that the centrifugal separator has a replaceable conducting apparatus. If the conducting apparatus of the centrifugal separator is replaceable, the conducting apparatus can be exchanged and replaced easily and quickly by a new conducting apparatus in the event of damage.

The term "conducting apparatus" (or also swirl apparatus) in the present invention describes any device, by means of which a main air volume stream can be divided into an outer volume stream and a core volume stream, with more dirt particles being present in the outer volume stream than in the core volume stream.

The replaceable conducting apparatus can be mounted replaceably inside the centrifugal separator in various ways. For example, it can be inserted radially from above into the centrifugal separator housing or preferably axially into the centrifugal separator housing.

If such a replaceable conducting apparatus of the centrifugal separator is mounted such that it can be arranged in the centrifugal separator housing in such a manner that it can be pushed in essentially axially with respect to the main flow direction according to the core volume stream in the combustion air, the structure of the intake system, in particular the centrifugal separator of the centrifugal separator device can be further simplified.

As a conducting apparatus which can be replaced in such a manner can essentially further develop a conventional intake system of a portable, manually guided piece of equipment, in particular a centrifugal separator of such an intake system, the features in connection with the replaceable conducting apparatus are also advantageous without the other features of the invention.

In order to be able to reduce considerably loading of the present intake system with dirt particles, it is advantageous if the centrifugal separator has a combustion air intake opening which is arranged on a side of the piece of equipment which faces away from a tool of a piece of equipment.

Loading of the intake system by dirt particles can be further reduced if the combustion air intake opening is shut off from the environment of the piece of equipment. It is advantageous in this connection if the combustion air intake opening is arranged beneath a casing of the piece of equipment. The combustion air intake opening is preferably arranged beneath the single-piece covering hood consisting of centrifugal separator housing and air filter housing or a cover.

The centrifugal separator housing can in particular have an even simpler construction if the centrifugal separator has a discharge screw for the outer volume stream which is formed by the centrifugal separator housing and/or by the air filter housing. This produces fewer individual components overall with regard to the present intake system.

In order to be able to conduct the outer volume stream more effectively, in particular from the discharge screw of the centrifugal separator, it is advantageous if the intake system has a discharge device for discharging the outer volume stream from the centrifugal separator, with the discharging device having a single exhaust hose with at least two hose lines which are fluidically separate but connected to each other.

As already described at the start, it is advantageous if the intake system has at least two centrifugal separators. Two outer volume streams are in particular created in this manner, with it being possible for the two outer volume streams to advantageously continue to be conducted if the two outer volume streams are not joined together directly at the outputs of the centrifugal separators. Hose lines which are connected to each other in one piece also simplify the assembly of the exhaust hose of the discharge device and save production costs with regard to the discharge device.

The term "discharge device" in the present case describes any device by means of which the intake system can be connected to an air volume stream conveying device so that ultimately the outer volume streams can be actively discharged.

The air volume stream conveying device can for example be realised by means of a bladed magnet wheel of the internal combustion engine of the piece of equipment. For example, the bladed magnet wheel is situated in a crankcase of the internal combustion engine.

So that the discharge device can be installed more easily, in particular on a crankcase, it is advantageous if in each case two first ends of the hose lines, which are fluidically separate but connected to each other, have a common installation flange.

In order to be able to mount the discharge device also on two centrifugal separators of the intake system which are at a distance from each other, it is further advantageous if in each case two further ends, which are opposite the two first ends, of the hose lines which are fluidically separate but connected to each other are arranged flexibly with respect to each other.

In this connection it is likewise advantageous if the two first ends of the hose lines are arranged further apart, preferably more than twice as far from each other as two further ends of the hose lines. This produces even more flexible connection options, in particular with regard to a centrifugal separator housing which is arranged further apart.

In order to be able to achieve essentially the same flow conditions with a simple design at two or a plurality of centrifugal separators of the centrifugal separator device, it can be advantageous if the hose lines, which are fluidically separate but connected to each other, have different internal cross sections. Different flow conditions at the centrifugal separators can for example arise if one of the centrifugal separators opens out differently in the air filter receiving space from another of the centrifugal separators, or if one of the hose lines is longer than another of the hose lines. These differences can be compensated sufficiently well with different hose line cross sections.

The object of the invention is furthermore achieved by a manually guided piece of equipment, in particular an angle grinder, with an internal combustion engine for driving a tool, in which the manually guided piece of equipment has an intake system according to one of the explained features and/or one of the explained combinations of features.

The present invention can in particular also be used advantageously on any other motorised piece of equipment, for example also hedge trimmers, leaf blowers, chainsaws or the like.

Figure 2:
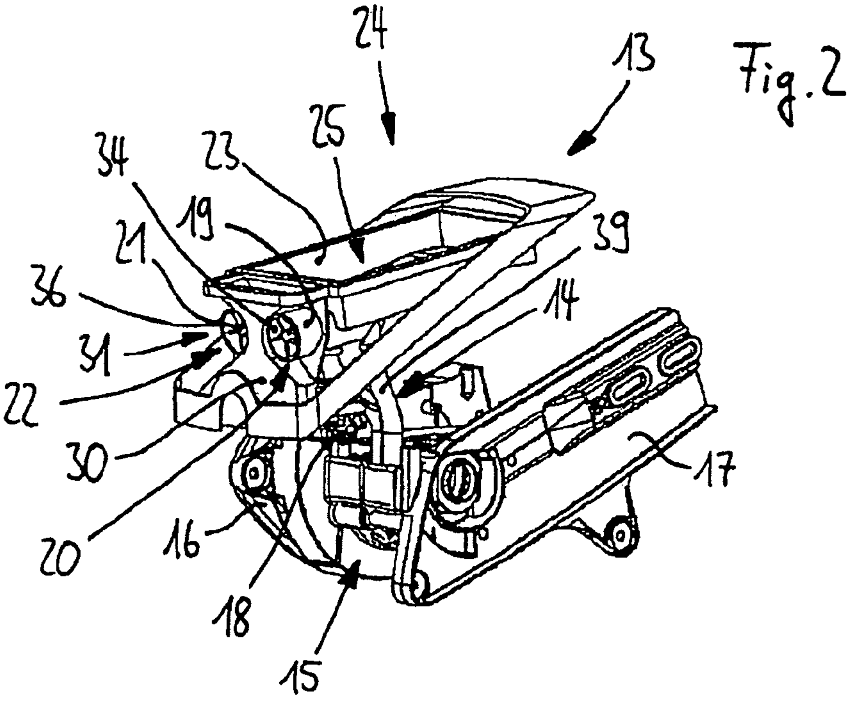
Figure 3:
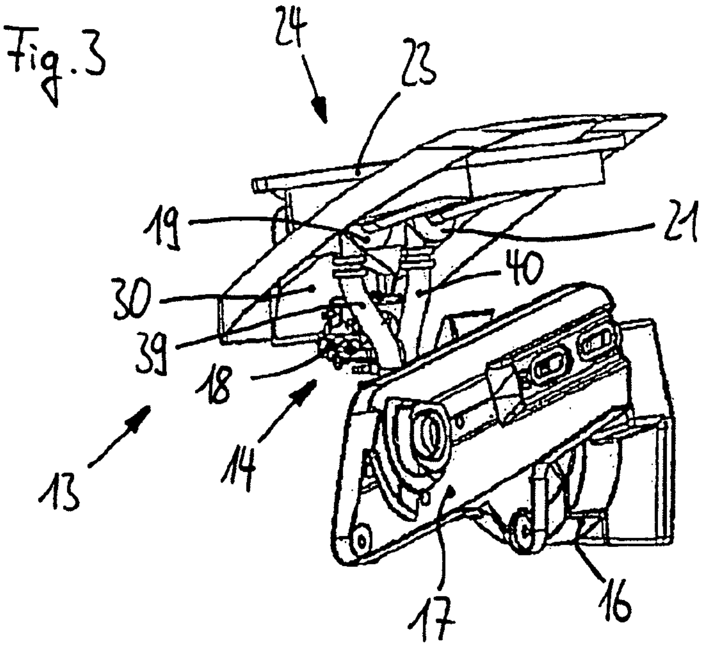
Figure 4:
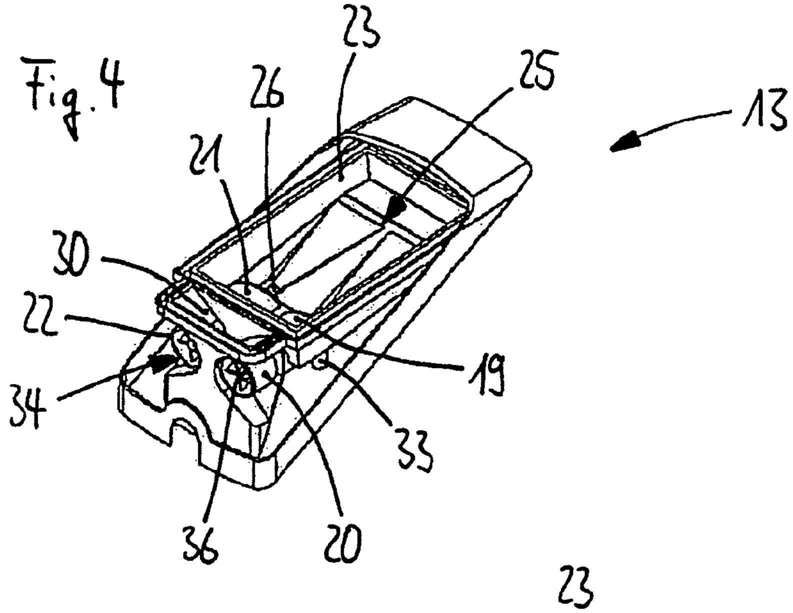
Figure 5:
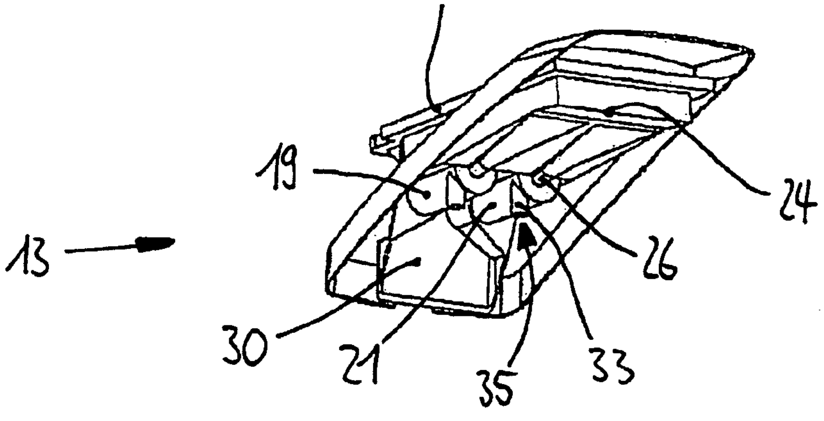
Figure 6:
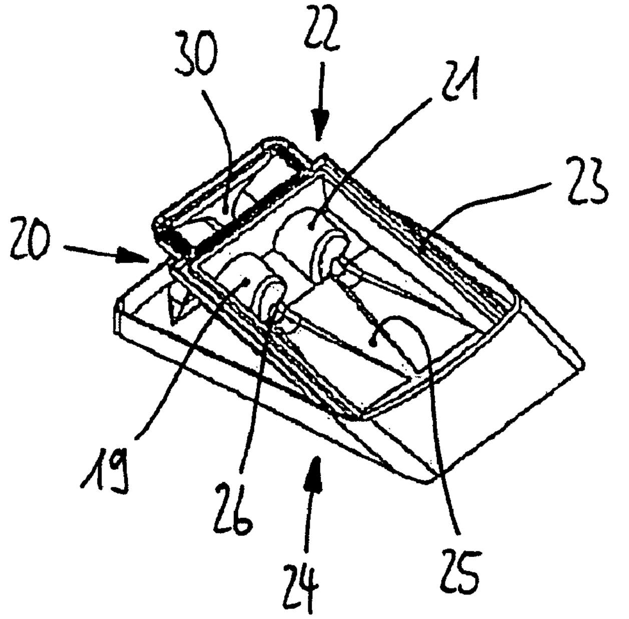
Figure 7:
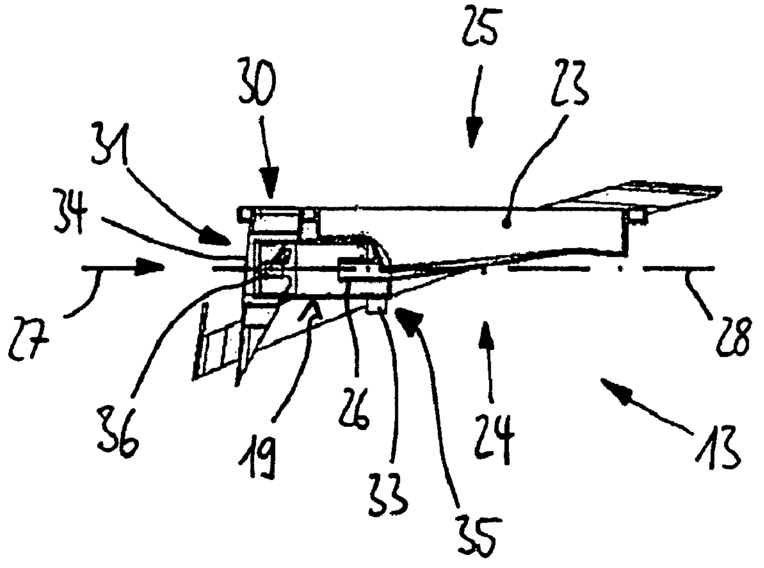
Figure 8:
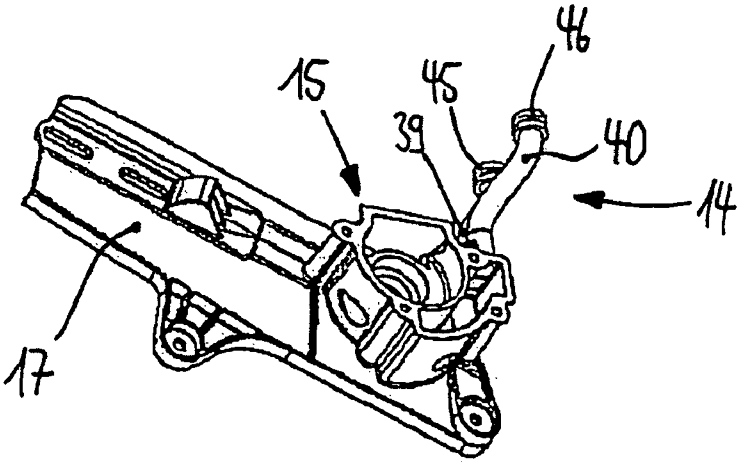
Figure 9:
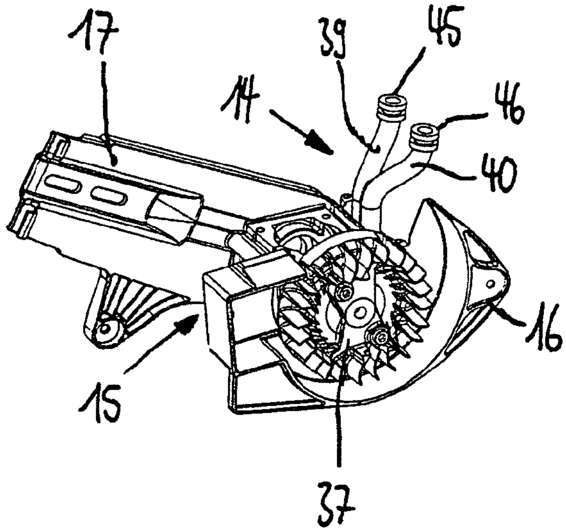
Figure 10:
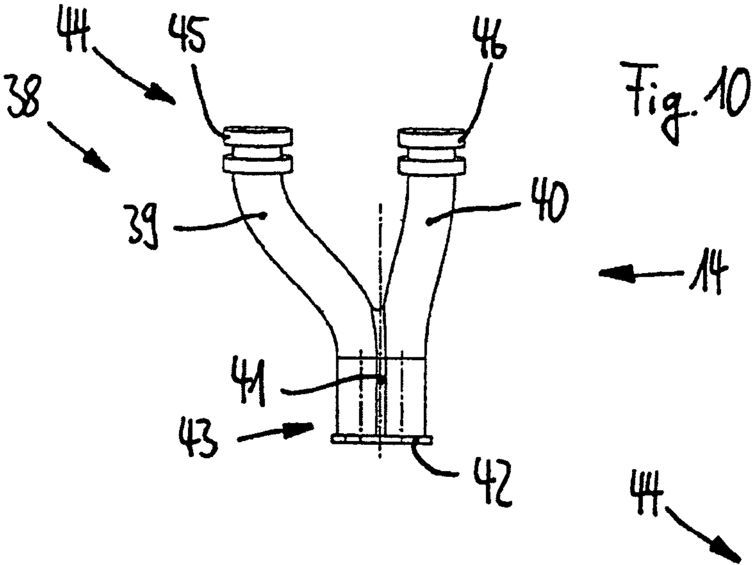
Figure 11:
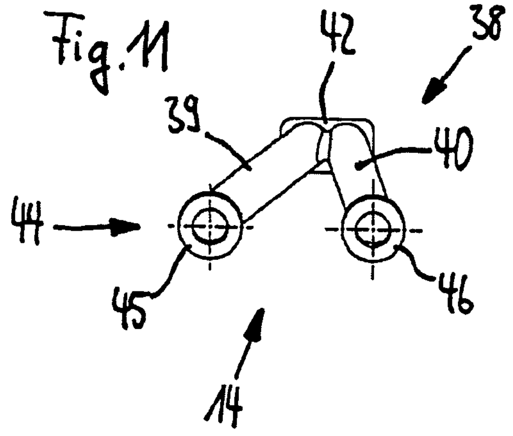
Figure 12:
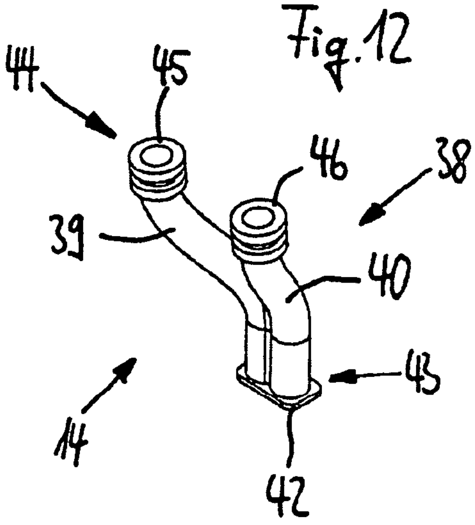

Further advantages, objectives and properties of the present invention are explained using the following description of the attached drawing, in which a portable, manually guided angle grinder is shown by way of example, in particular with its intake system. In the figures, in a schematic representation:

FIG. 1 shows a perspective view of a portable, manually guided angle grinder with a cutting wheel which is driven by means of an internal combustion engine, FIG. 2 shows a perspective view of an intake system for sucking in combustion air for the internal combustion engine of the angle grinder of FIG. 1, wherein two centrifugal separator housings of a centrifugal separator device of the intake system project directly into an air filter receiving space of an air filter device of the intake system, FIG. 3 shows a further perspective view of the intake system of FIG. 2, FIG. 4 shows a perspective view of a single-piece covering hood of the portable, manually guided angle grinder of FIGS. 1 to 3, FIG. 5 shows a perspective view from below of the single-piece covering hood of FIG. 4, FIG. 6 shows a further perspective view from below of the single-piece covering hood of FIGS. 4 and 5, FIG. 7 shows a side view of the single-piece covering hood of FIGS. 4 to 6, FIG. 8 shows a perspective view of a crankcase of the portable, manually guided angle grinder of FIG. 1 with an intake hose fixed thereon, comprising two hose lines for discharging outer volume streams, FIG. 9 shows a further perspective view of the crankcase of FIG. 8 with a rotary bladed magnet wheel therein, FIG. 10 shows a side view of an exhaust hose for discharging outer volume streams, FIG. 11 shows a plan view of the exhaust hose of FIG. 10, and FIG. 12 shows a perspective view of the exhaust hose of FIGS. 10 and 11.

The portable, manually guided piece of equipment 1 shown in FIG. 1 comprises an intake system 2, which can provide filtered combustion air from the environment 4 to an internal combustion engine 3 for ventilating the internal combustion engine 3.

As the intake system 2 also filters the combustion air which is sucked in for the internal combustion engine 3, the intake system 2 is at the same time also a filter system for the sucked in combustion air.

The piece of equipment 1 is configured in this exemplary embodiment as an angle grinder 5, in which a cutting wheel 6 is driven by means of the internal combustion engine 3, with a transmission of force taking place between the internal combustion engine 3 or components thereof and the cutting wheel 6 by means of a belt drive 7.

The piece of equipment 1 has a guide handle 8 above the intake system 2 and an operating handle 11 in its rear region 9 which is situated at an end 10 of the angle grinder 5 which faces away from the cutting wheel 6.

The intake system 2 is protected from the environment 4 by means of a plastic casing 12, which is fixed to a covering hood 13 (see in particular FIGS. 2 to 7), which is shaped in one piece and consists of plastic.

The single-piece covering hood 13 is connected fluidically to a crankcase 15 of the internal combustion engine 3 by means of a discharge device 14 (see in particular FIGS. 10 to 12).

The crankcase 15 is in the present case located between an engine housing 16 of the internal combustion engine 3 and a belt guard 17 of the belt drive 7. In the illustrations according to FIGS. 2 and 3, a carburettor 18 of the internal combustion engine 3 can also be seen above the crankcase 15 and adjacent to the discharge device 14.

The single-piece covering hood 13 comprises a first centrifugal separator housing 19 of a first centrifugal separator 20 of a centrifugal separator device of the angle grinder 5, a second centrifugal separator housing 21 of a second centrifugal separator 22 of the centrifugal separator device and an air filter housing 23 of an air filter device 24, with the centrifugal separator housings 19 and 21 and the air filter housing 23 being injection-moulded together and in one piece in an injection moulding process to form the single-piece covering hood 13.

The centrifugal separator device, which is not given detailed reference numerals in this case, comprises in this concrete exemplary embodiment a first centrifugal separator 20 and a second centrifugal separator 22. The centrifugal separator device can however also have further centrifugal separators.

The air filter housing 23 bounds at least partially an air filter receiving space 25 for an air filter (not shown here). The single-piece covering hood 13 is configured in such a manner that both centrifugal separator housings 19 and 21 end directly at the air filter receiving space 25 and both centrifugal separator housings 19 and 21 even project directly into the air filter receiving space 25, as can be seen in particular in the illustration according to FIG. 4.

Whereas the air filter housing 23 can close off the air filter receiving space 25 in the region of the single-piece covering hood 13, the air filter receiving space 25 is closed off in a suitable manner above the air filter housing 23 by the casing 12 of the single-piece covering hood 13 as soon as the casing 12 is properly mounted on the single-piece covering hood.

So that a core volume stream generated by the centrifugal separators 20, 22 can in each case get from the respective centrifugal separator 20 or 22 into the air filter space without being deflected, each of the centrifugal separator housings 19 and 21 comprises a dip tube 26 (only provided with reference numerals here by way of example, as both centrifugal separators have an essentially identical construction) with an axial main flow direction 27 (see FIG. 7) of the core volume stream, with the axial main flow direction 27 of the respective dip tube 26 being essentially aligned with an axial main extent 28 of the air filter receiving space 25. A core volume stream outlet of the centrifugal separator 19 or 21 can be arranged essentially axially upstream of a core volume stream inlet of the air filter receiving space 25, with it being possible in a particularly simple exemplary embodiment for the core volume stream outlet of the centrifugal separator housing 19 and 21 to be identical to the core volume stream inlet of the air filter receiving space 25.

In this respect the dip tube 26 constitutes in particular an axial conducting device for the core volume stream, by means of which the core volume stream can be conducted axially from the centrifugal separators 20 and 22 without deflection to the air filter receiving space 25, as a result of which only small and ideally negligible flow energy losses with respect to the core volume stream are produced during this transition.

The intake system 2 of the piece of equipment 1 can have an even more simplified and compact construction if a core volume stream conducting device, which is downstream of the air filter receiving space 25, is placed between two centrifugal separator housings 19 and 21. The respective core volume stream, which is filtered by means of the air filter can advantageously be conducted to the carburettor 18 of the internal combustion engine 3 via this core volume stream conducting device.

In the present case the centrifugal separators 20 and 22 have a particularly simple construction, as they have in each case a single-piece centrifugal separator housing 19 or 21 with a combustion air input device 31, a dip tube 26 as the core volume stream output device and an exhaust manifold 33 as the outer volume stream output device. The combustion air input device 31, the core volume stream output device and the outer volume stream output device are preferably injection-moulded together in a plastic injection-moulding process as a single-piece centrifugal separator housing 19 or 21.

The combustion air input device 31 can in this case be realised in a constructively particularly simple manner by just a centrifugal separator opening, whereas the core volume stream output device can be provided in a simple design by the above-described dip tube 26, with in the present case the combustion air input device 31 and the core volume stream output device being arranged axially one behind the other on the respective centrifugal separator housing 19 or 21. This makes it possible to conduct the core volume stream without deflection from the respective centrifugal separator 20 or 22 into the air filter receiving space 25.

A combustion air intake opening 34 of the intake system 2 is situated in a shut off manner below the casing 12 when the piece of equipment 1 is assembled properly, so that even coarse dirt particles cannot get into the intake system 2 through the combustion air intake opening 34, or only to a negligible extent.

The exhaust manifold 33 is formed in each case by means of a discharge screw 35 on the centrifugal separators 20 and 22 so that the respective outer volume stream can be guided away radially from the centrifugal separator 20 or 22. The respective discharge screw 35 is preferably formed by one of the centrifugal separator housings 19 or 21 and/or by the air filter housing 23.

In particular, the structure of the centrifugal separator 20 or 22 can be further simplified if each of the centrifugal separators 20 and 22 has a replaceable conducting apparatus 36. Advantageously, the replaceable conducting apparatus 36 can be replaced quickly and easily by a new replaceable conducting apparatus in the even of damage.

The respective replaceable conducting apparatus 36 of the centrifugal separator 20 or 22 can be replaced in a particularly simple manner if the replaceable conducting apparatus 36 is mounted such that it can be pushed into the respective centrifugal separator housing 19 or 21 essentially axially with respect to the axial main flow direction 27 of the core volume stream.

The combustion air which is sucked in from the environment 4 can be accelerated in the main flow direction 27 within the respective centrifugal separator 20 or 22 by means of the replaceable conducting apparatus 36. The replaceable conducting apparatus 36 in each case causes the sucked in combustion air to be set in rotation about the axis, which is shown by way of example in FIG. 7, of the axial main extent 28. In the process air portions with dirt particles which are in the sucked in air are displaced radially outwards in the direction of the outer volume stream, while the core volume stream, which is loaded with dirt particles to a lesser extent, remains in the region of the indicated axis 28 and gets via the respective dip tube 26 into the air filter receiving space 25 and is conducted from there to the carburettor 18 of the internal combustion engine by means of the air duct 30.

The respective outer volume stream is discharged from the respective centrifugal separator housing 19 or 21 to the exhaust manifold 33 by means of the discharge screw 35. The discharge device 14 is fixed to the outer volume stream output device 33, with the discharge device 14 being fluidically connected to the crankcase 15.

A bladed magnet wheel 37 rotates within the crankcase 15 and can be driven by the internal combustion engine 3. In this manner a vacuum can be produced within the crankcase by means of the bladed magnet wheel 37, as a result of which in particular the outer volume stream is sucked out of the respective centrifugal separator housing 19 or 21 via the discharge device 14 by means of the bladed magnet wheel 37. The outer stream can be output back into the environment 4 via the crankcase 15.

In the present exemplary embodiment the discharge device 14 consists of a single exhaust hose 38 (see in particular FIGS. 10 to 12), with the single exhaust hose 38 comprising a first hose line 39 and a second hose line 40. Both hose lines 39 and 40 are connected unreleasably to each other in a region 41 of a common assembly flange 42 so that the single exhaust hose 38 is present overall as a discharge device 14 of compact construction.

The common assembly flange 42 is in each case provided at first ends 43 of the exhaust hose 38, with it being possible to fix the exhaust hose 38 in a simple design to the crankcase 15 by means of the common assembly flange 42.

A connecting flange 45 and 46 is provided in each case on two further ends 44, which lie opposite the two first ends 43, of the two hose lines 39 and 40. The two further ends 44 are more than twice as far apart from each other than the two first ends 43 of the two hose lines 39 and 40. Because of this and that the two further ends 44 are not connected to each other by a common assembly flange 42, the two hose lines 39 and 40 can be moved flexibly at least in the region of the two further ends 44, as a result of which the exhaust hose 38 can be connected more quickly and easily to the respective exhaust manifold 33.

As the two hose lines 39 and 40 are of different lengths owing to their different curvatures, they have different internal cross sections, as result of which a different flow behaviour of the outer volume streams owing to the difference in length of the two hose lines 39 and 40 can be compensated, so that outer volume streams can essentially be present at the two centrifugal separators 20 and 22 which are different at least not owing to the differently formed hose lines 39 and 40.

All the features disclosed in the application documents can be claimed as essential to the invention as long as they are individually or in combination with each other novel compared to the prior art.

LIST OF REFERENCE SYMBOLS

1 Portable, manually guided piece of equipment
2 Intake system
3 Internal combustion engine
4 Environment
5 Angle grinder
6 Cutting wheel
7 Belt drive
8 Guide handle
9 Rear region
10 End facing away
11 Operating handle
12 Cover
13 Covering hood
14 Discharge device
15 Crankcase
16 Engine housing
17 Belt guard
18 Carburettor
19 First centrifugal separator housing
20 First centrifugal separator
21 Second centrifugal separator housing
22 Second centrifugal separator
23 Air filter housing
24 Air filter device
25 Air filter receiving space
26 Dip tube
27 Axial main flow direction
28 Axial main flow
29—
30 Air duct
31 Combustion air input device
32—
33 Exhaust manifold
34 Combustion air intake opening
35 Discharge screw
36 Conducting apparatus
37 Bladed magnet wheel
38 Single exhaust hose
39 First hose line
40 Second hose line
41 Region
42 Common assembly flange
43 Two first ends
44 Two further ends
45 First connecting flange
46 Second connecting flange

What is claimed is:

1. An intake system for sucking in combustion air for an internal combustion engine of a portable, manually-guided piece of equipment, comprising:

two centrifugal separators, each having a centrifugal separator housing; and an air filter device having an air filter housing, the air filter housing bounding an air filter receiving space for an air filter, in which the combustion air is separated by means of the two centrifugal separators into a core volume stream and an outer volume stream, wherein the core volume stream is fed to the internal combustion engine through the air filter receiving space, each of the two centrifugal separator housings is arranged on the air filter housing such that each of the two centrifugal separator housings ends directly at the air filter receiving space or projects directly into the air filter receiving space, the two centrifugal separators consist of a first centrifugal separator and a second centrifugal separator, an axial main flow direction, of a dip tube of the first centrifugal separator and of a dip tube of the second centrifugal separator, is essentially aligned with an axial main extent of the air filter receiving space, the dip tube of the first centrifugal separator and the dip tube of the second centrifugal separator are formed as an axial conducting device for the core volume stream, by means of which the core volume stream is conducted axially from a corresponding one of the first centrifugal separator and the second centrifugal separator to the air filter receiving space without being deflected, and the two centrifugal separator housings and the air filter housing are formed as a single-piece covering hood of the piece of equipment.

2. The intake system according to claim 1, wherein a core volume stream outlet of each centrifugal separator housing is arranged essentially axially upstream of a core volume stream inlet of the air filter receiving space, as viewed in an axial main flow direction of the core volume stream.

3. The intake system according to claim 1, wherein an air duct, which is downstream of the air filter receiving space, is arranged as a core volume stream conducting device between the two centrifugal separator housings.

4. The intake system according to claim 1, wherein each centrifugal separator housing is formed in one piece comprising at least one combustion air input device, the corresponding dip tube as the core volume stream output device and the exhaust manifold as an outer volume stream output device.

5. The intake system according to claim 1, wherein a combustion air input device of each centrifugal separator housing and the corresponding dip tube as a core volume stream output device of the corresponding centrifugal separator housing are arranged axially one behind the other on the corresponding centrifugal separator housing.

6. The intake system according to claim 1, wherein the first centrifugal separator and/or the second centrifugal separator has a replaceable conducting apparatus.

7. The intake system according to claim 1, wherein a replaceable conducting apparatus of at least one of the first centrifugal separator and the second centrifugal separator is mounted such that the conducting apparatus can be arranged in the corresponding centrifugal separator housing in such a manner that the conducting apparatus can be pushed in essentially axially with respect to the axial main flow direction of the core volume stream of the combustion air.

8. The intake system according to claim 1, wherein at least one of the first centrifugal separator and the second centrifugal separator has a combustion air intake opening, which is arranged on a side of the piece of equipment that faces away from a tool of the piece of equipment, wherein the combustion air intake opening is arranged beneath a casing consisting of a cover or a covering hood of the piece of equipment.

9. The intake system according to claim 1, wherein at least one of the first centrifugal separator and the second centrifugal separator has a discharge screw for the outer volume stream that is formed from the centrifugal separator housing and/or from the air filter housing.

10. A manually guided piece of equipment, having an internal combustion engine for driving a tool, comprising an intake system according to claim 1.

11. The intake system according to claim 1, further comprising a discharge device for discharging more than one outer volume stream, wherein the discharge device has a single exhaust hose with at least two hose lines that are fluidically separate but connected to each other.

12. The intake system according to claim 11, wherein two first ends of the hose lines that are fluidically separate but connected to each other, have a common assembly flange.

13. The intake system according to claim 12, wherein two further ends, which are opposite the two first ends, of the hose lines that are fluidically separate but connected to each other, are arranged flexibly with respect to each other.

14. The intake system according to claim 11, wherein two first ends of the hose lines can be arranged more than twice as far apart from each other as the two further ends.

15. The intake system according to claim 11, wherein the hose lines that are fluidically separate but connected to each other have different inner cross-sections.

* * * * *